(12) United States Patent
Sobel et al.

(10) Patent No.: US 8,959,509 B1
(45) Date of Patent: Feb. 17, 2015

(54) TECHNIQUES FOR VIRTUAL MACHINE BACKUP SCHEDULING

(75) Inventors: William E. Sobel, Jamul, CA (US); Jennifer Sterner, Orlando, FL (US)

(73) Assignee: Symantec Corporation, Mountain View, CA (US)

( * ) Notice: Subject to any disclaimer, the term of this patent is extended or adjusted under 35 U.S.C. 154(b) by 1830 days.

(21) Appl. No.: 12/131,502

(22) Filed: Jun. 2, 2008

(51) Int. Cl.
*G06F 9/46* (2006.01)

(52) U.S. Cl.
USPC .......................................................... 718/1

(58) Field of Classification Search
None
See application file for complete search history.

(56) References Cited

U.S. PATENT DOCUMENTS

| 7,079,980 | B2 * | 7/2006 | Muraoka | 702/182 |
| 2004/0205206 | A1 * | 10/2004 | Naik et al. | 709/230 |
| 2009/0106756 | A1 * | 4/2009 | Feng et al. | 718/100 |

OTHER PUBLICATIONS

"Understanding VMware Consolidated Backup", VMware, Inc., pp. 1-9, copyright 2007.*
"Virtual Machine Backup Guide—ESX Server 3.0.1 and VirtualCenter 2.0.1", VMware, Inc., pp. 1-71, copyright 2006.*
"A CommVault White Paper: CommVault Galaxy Backup & Recovery", CommVault Systems, Inc., 2008, 39 pages.
"IBM Tivoli Storage Manager Version 5.5—Using the Application Programming Interface", International Business Machines Corporation, 2007, 308 pages.
CommVault Data Sheet; CommNet Service Manager 7.0, retrieved from the Internet at: http://www.commvault.com/pdf/DS_CNSM_Overview.pdf (2007).

* cited by examiner

*Primary Examiner* — Gregory A Kessler
(74) *Attorney, Agent, or Firm* — Wilmer Cutler Pickering Hale and Dorr LLP

(57) ABSTRACT

Techniques for virtual machine backup scheduling are disclosed. In one particular exemplary embodiment, the techniques may be realized as an apparatus for scheduling one or more backup operations. The apparatus may comprise one or more virtual machines to operate on one or more systems. The apparatus may also comprise a backup manager to monitor resource requirements associated with at least one of the one or more virtual machines, associate the resource requirements with each of the one or more virtual machines, and to create a backup schedule for the one or more virtual machines based at least in part upon the resource requirements associated with the at least one of the one or more virtual machines. The apparatus may further comprise a module for implementing backups of the one or more virtual machines based at least in part upon the backup schedule created by the backup manager.

20 Claims, 3 Drawing Sheets

| Name | Priority | Monday | | | | | | ... | 21 | 22 | 23 | 24 | Tuesday | | | | | ... | 21 | 22 | 23 | 24 |
|---|---|---|---|---|---|---|---|---|---|---|---|---|---|---|---|---|---|---|---|---|---|---|
| | | 1 | 2 | 3 | 4 | 5 | | | | | | | 1 | 2 | 3 | 4 | 5 | | | | | |
| VM1 | 1 | 0 | 20 | 20 | 20 | 20 | | | 20 | 25 | 80 | 90 | 0 | 20 | 20 | 20 | 20 | | 0 | 0 | 0 | 0 |
| VM2 | 5 | 0 | 20 | 20 | 0 | 0 | | | 0 | 0 | 0 | 0 | 0 | 0 | 0 | 0 | 0 | | 0 | 0 | 0 | 0 |
| VM3 | 6 | 90 | 5 | 90 | 0 | 0 | | | 0 | 0 | 0 | 0 | 0 | 0 | 0 | 0 | 0 | | 0 | 0 | 0 | 0 |
| Backup Window | | | | | | | | | | | | | | | | | | | | | | |

FIG. 3

TECHNIQUES FOR VIRTUAL MACHINE BACKUP SCHEDULING

FIELD OF THE DISCLOSURE

The present disclosure relates generally to backup operations, and more particularly, to techniques for virtual machine backup scheduling.

BACKGROUND OF THE DISCLOSURE

A backup operation associated with a computer system may require a great deal of resources, both in terms of processor resources and memory resources. In a computerized system hosting one or more virtual machines, where one or more of the virtual machines is backed up, the requirements to perform backup operations on the virtual machines may increase the processor and memory requirements. Devoting processor and memory resources to the simultaneous backup of one or more virtual machines may remove resources from other, competing, virtual machines.

Moreover, during the time that a virtual machine is being backed up, it may not be available, or may have limited availability to perform the operations for which it was instantiated. Virtual machines may operate according to a predetermined schedule. For example, a virtual machine may be instantiated to control a database linking operation for a product database after new products are added. New products may only be added to the exemplary database at 5 PM every Tuesday evening, so the exemplary virtual machine may require a relatively greater amount of processor and memory resources between 5 PM and 7 PM on Tuesdays, and may require a relatively smaller amount of processor and memory resources during the rest of the week, or may even require only a nominal amount of resources during the "non-peak" time.

Virtual machine backup operations may be scheduled by hand, so that, for example, a system administrator may note when specific virtual machines on a system are in a "non-peak" time, and may specify backup operations to take place when all or most of the virtual machines are in a "non-peak" time. However, virtual machines may be migrated from one physical system to another physical system in order to balance the processor and/or memory requirements, to upgrade physical systems, or for other reasons. Hand-scheduled backup operations for individual virtual machines moved onto a new physical system may occur at times of increased activity of the moved virtual machines or virtual machines already existing on that system. Alternatively, new virtual machines may be created on a physical system, which may conflict with the backup schedules of existing virtual machines. This is a problem because the movement of virtual machines, while expedient from an efficiency standpoint, creates problems in creating an efficient backup schedule.

In view of the foregoing, it may be understood that there are significant problems and shortcomings associated with current backup technologies.

SUMMARY OF THE DISCLOSURE

Techniques for virtual machine backup scheduling are disclosed. In one particular exemplary embodiment, the techniques may be realized as an apparatus for scheduling one or more backup operations. The apparatus may comprise one or more virtual machines to operate on one or more systems. The apparatus may also comprise a backup manager to monitor resource requirements associated with at least one of the one or more virtual machines, associate the resource requirements with each of the one or more virtual machines, and to create a backup schedule for the one or more virtual machines based at least in part upon the resource requirements associated with the at least one of the one or more virtual machines. The apparatus may further comprise a module for implementing backups of the one or more virtual machines based at least in part upon the backup schedule created by the backup manager.

In accordance with other aspects of this particular exemplary embodiment, one or more virtual machines may be associated with a priority level, and the backup schedule may be further based at least in part on the priority level assigned to the at least one of the one or more virtual machines.

In accordance with further aspects of this particular exemplary embodiment, the resource requirements may include processor requirements.

In accordance with further aspects of this particular exemplary embodiment, the resource requirements may include memory requirements.

In accordance with further aspects of this particular exemplary embodiment, the resource requirements may include network requirements.

In accordance with further aspects of this particular exemplary embodiment, the resource requirements may include noting if the virtual machine is in operation.

In accordance with further aspects of this particular exemplary embodiment, the backup manager may monitor the resource requirements associated with the at least one of the one or more virtual machines once per second.

In accordance with further aspects of this particular exemplary embodiment, the backup manager may monitor the resource requirements associated with the at least one of the one or more virtual machines once per minute.

In accordance with further aspects of this particular exemplary embodiment, the backup manager may monitor the resource requirements associated with the at least one of the one or more virtual machines once per hour.

In another particular exemplary embodiment, the techniques may be realized as a method for scheduling one or more backup operations. The method may comprise providing one or more virtual machines to operate on one or more systems. The method may also comprise monitoring resource requirements associated with at least one of the one or more virtual machines. The method may further comprise associating the resource requirements with each of the one or more virtual machines. The method may additionally comprise creating a backup schedule for the one or more virtual machines based at least in part upon the resource requirements associated with the at least one of the one or more virtual machines. The method may still further comprise implementing backups of the one or more virtual machines based at least in part upon the backup schedule created by the backup manager.

In accordance with other aspects of this particular exemplary embodiment, one or more virtual machines may be associated with a priority level, and the backup schedule may be further based at least in part on the priority level assigned to the at least one of the one or more virtual machines.

In accordance with further aspects of this particular exemplary embodiment, the resource requirements may include processor requirements.

In accordance with further aspects of this particular exemplary embodiment, the resource requirements may include memory requirements.

In accordance with further aspects of this particular exemplary embodiment, the resource requirements may include network requirements.

In accordance with further aspects of this particular exemplary embodiment, the resource requirements may include noting if the virtual machine is in operation.

In accordance with further aspects of this particular exemplary embodiment, the backup manager may monitor the resource requirements associated with the at least one of the one or more virtual machines once per second.

In accordance with further aspects of this particular exemplary embodiment, the backup manager may monitor the resource requirements associated with the at least one of the one or more virtual machines once per minute.

In accordance with further aspects of this particular exemplary embodiment, the backup manager may monitor the resource requirements associated with the at least one of the one or more virtual machines once per hour.

In another particular exemplary embodiment, the techniques may be realized as at least one processor-readable medium for storing a computer program of instructions configured to be readable by at least one processor for instructing the at least one processor to execute a computer process for performing the method as recited above.

In another particular exemplary embodiment, the techniques may be realized as an article of manufacture for scheduling one or more backup operations, wherein the article of manufacture comprises at least one processor-readable medium and instructions carried on the at least one medium, wherein the instructions are configured to be readable from the at least one medium by at least one processor and thereby cause the at least one processor to operate so as to provide one or more virtual machines to operate on one or more systems, monitor resource requirements associated with at least one of the one or more virtual machines, associate the resource requirements with each of the one or more virtual machines, create a backup schedule for the one or more virtual machines based at least in part upon the resource requirements associated with the at least one of the one or more virtual machines, and implement backups of the one or more virtual machines based at least in part upon the backup schedule created by the backup manager.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 3 shows exemplary historical data of three virtual machines in accordance with an embodiment of the present disclosure.

DETAILED DESCRIPTION OF EXEMPLARY EMBODIMENTS

Figure 1:
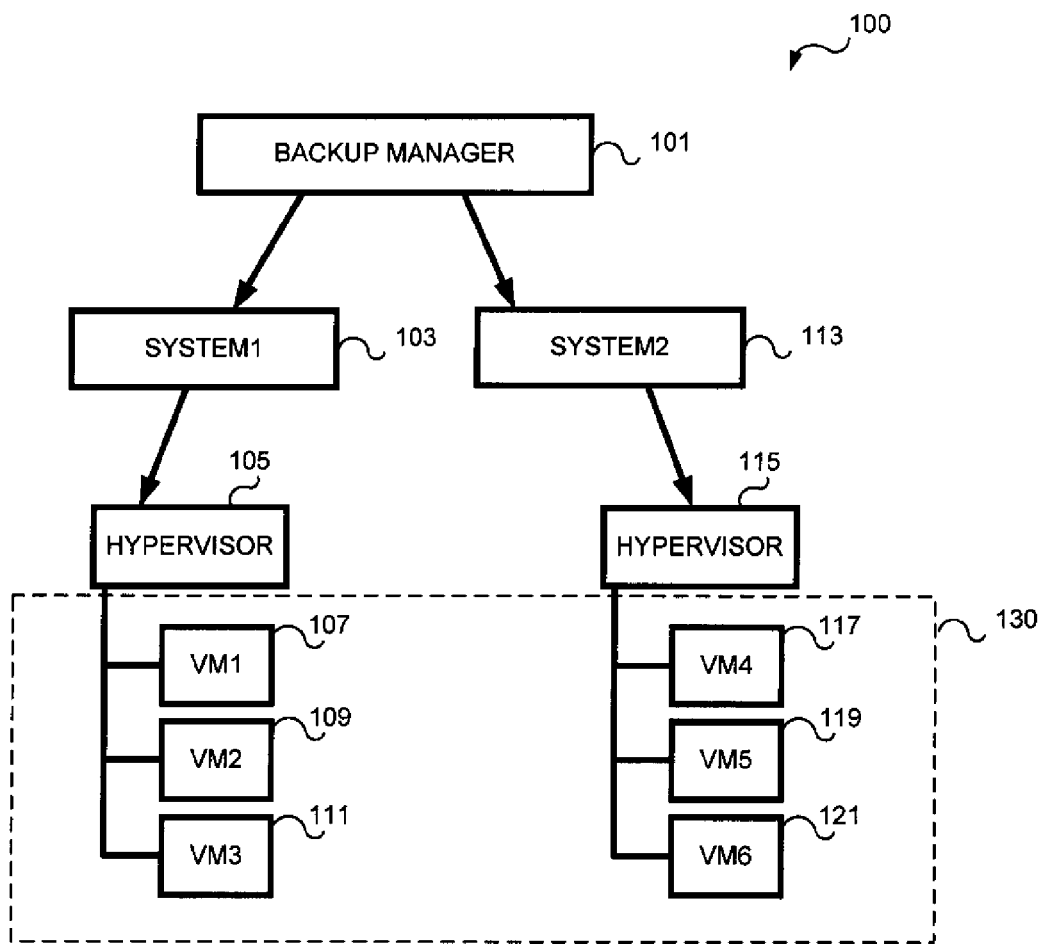
FIG. 1 shows a system-level diagram of a backup manager system in accordance with an embodiment of the present disclosure.

Referring to FIG. 1, there is shown a system-level diagram of a backup manager system 100 in accordance with an embodiment of the present disclosure. As shown in FIG. 1, the backup manager system 100 comprises a backup manager 101 in communication with one or more systems 103 and 113. Each of the systems 103 and 113 may operate a hypervisor 105 and 115, which may be operable to instantiate one or more virtual machines (VM) 107, 109, 111, 117, 119, and 121 (collectively, 130).

The backup manager 101 may be a separate system or systems operating for the task of scheduling backups, or the backup manager 101 may be embodied as one or more processes or software instructions operating on one or more of the systems 103 and 113 associated with the virtual machines 130. The backup manager 101, if separate from the systems 103 and 113, may be in communication with the systems 103 and 113 via a network (not shown), a direct connection, or another technique for one computer or computerized system to communicate with another computer or computerized system.

The backup manager 101 may also be in communication with the one or more virtual machines 130. The backup manager 101 may then record information regarding the one or more virtual machines 130. For example, the backup manager 101 may record information or resource requirements regarding a virtual machine's memory usage, processor usage, network usage, virtual machine up time, relative weight, disk usage, and/or available system capacity. The backup manager 101 may also record other information regarding or related to the virtual machines 130. The backup manager 101 may record the information periodically. For example the backup manager 101 may record information regarding virtual machines 130 at one second intervals or less, five second intervals, five minute intervals, hourly intervals, daily intervals, and/or monthly intervals. The backup manager 101 may average one or more values across a period of time, so that, for example, memory usage determined at five second intervals may be aggregated and recorded at one hour intervals.

The backup manager 101 may also associate a priority or a priority level with a virtual machine 130. The priority may indicate a preference that one or more virtual machines 130 receive access to processor, memory, network bandwidth or other network resources, or indicate other metrics for one or more virtual machines 130. For example, a virtual machine having a priority of 6 may receive a higher amount of system capacity than a virtual machine having a priority of 1. Alternatively, a virtual machine having a priority of 1 may be suspended while a virtual machine having a priority of 6 may utilize the resources of a physical system in which both virtual machines may co-exist.

The backup manager 101 may also store an estimated backup completion time for the one or more virtual machines 130. The estimated backup completion time may be the time estimated for a virtual machine 130 to be backed up. The estimated backup completion time may be determined by monitoring previous backups of the virtual machine 130. For example, the estimated backup completion time may be determined based on an average of all of the previous backups of the virtual machine 130, or an average of the last five backups of the virtual machine 130. The estimated backup completion time may also be estimated from other characteristics of the virtual machine 130. For example, the memory requirements of the virtual machine 130 or the amount of disk space that the virtual machine 130 utilizes may be included in an estimate of backup time.

The backup manager 101 may record information regarding the one or more virtual machines 130 into, for example, memory associated with the backup manager 101, disk storage associated with the backup manager 101, or other storage media. The backup manager 101 may also recall information regarding the one or more virtual machines 130 from a memory, disk, or other storage media associated with the backup manager 101. The backup manager 101 may associate the information with each of the virtual machines 130. For example, the virtual machine 130 may incorporate the information from the backup manager 101 into a file system of the virtual machine 130. Each virtual machine 130 may record its own information so that if a virtual machine is moved from one physical system 103 and 113 to another physical system 103 and 113, the information regarding the virtual machine may also be transferred to the other physical system 103 and 113.

Systems 103 and 113 may be physical devices commonly known in the art. For example, systems 103 and 113 may be implemented as servers. Systems 103 and 113 may receive data from one or more inputs, produce data through one or more outputs, have one or more persistent storage devices for storing and retrieving data, and be in communication with one or more networks. Systems 103 and 113 may operate using an operating system, and may load the operating system into memory in local persistent storage, for example a hard drive, or may load the operating system into memory in shared storage across a network.

Each hypervisor 105 and 115 may operate on each of the one or more systems 103 and 113. The hypervisors 105 and 115 may manage the creation and/or operation or one or more virtual machines 130. For example, the hypervisors 105 and 115 may interface between the physical services provided by the systems 103 and 113, for example, the processor or processors and the memory of the systems 103 and 113, and the one or more virtual machines 130. The hypervisors 105 and 115 may also create new instances of virtual machines 130, or may manage or coordinate the transfer of one or more virtual machines 130 from one system 103 and 113 to another system 103 and 113. Of course, other methods may be utilized to create, transfer, manage, and/or control one or more virtual machines 130. For example, hardware in communication with the system 103 and 113 may be operable to create, transfer, manage, and/or control the one or more virtual machines 130. Alternatively, other software or hardware may be executed or may be associated with the system 103 and 113 to create, transfer, manage, and/or control the one or more virtual machines 130.

Within the system 100, one or more virtual machines 130 may be instantiated. For example, within System1 103, VM1 107, VM2 109, and VM3 111 may be instantiated. A system 103 and 113 may include any number of virtual machines 130. A virtual machine 130 may appear to be a physical system, but instead may be instantiated on a physical system 103 and 113. A virtual machine 130 may appear to receive data from one or more inputs, produce data through one or more outputs, have addressable memory and persistent storage for storing and retrieving data, and be in communication with one or more networks.

Virtual machines 130 may migrate between physical systems 103 and 113. For example, VM1 107, shown hosted on System1 103, may move to System2 113. Migration may help to distribute processor or memory or persistent storage requirements between systems. Virtual machines 130 may also migrate between systems 103 and 113 to diversify operations. For example, if System1 103 fails, at least one virtual machine hosted on System2 113 may be available to continue processing tasks previously processed on System1 103.

Each of the one or more networks referenced above may include, but are not limited to, for example, a wide area network (WAN), a local area network (LAN), a global network such as the Internet, a telephone network such as a public switch telephone network, a wireless communication network, a cellular network, an intranet, or the like, or any combination thereof. Also, each network may be used so that components of the present disclosure may be in communication with one another. In exemplary embodiments of the present disclosure, a network may include one or any number of the exemplary types of networks mentioned above operating as a stand-alone network or in cooperation with each other. Use of the term network herein is not intended to limit the network to a single network.

Figure 2:
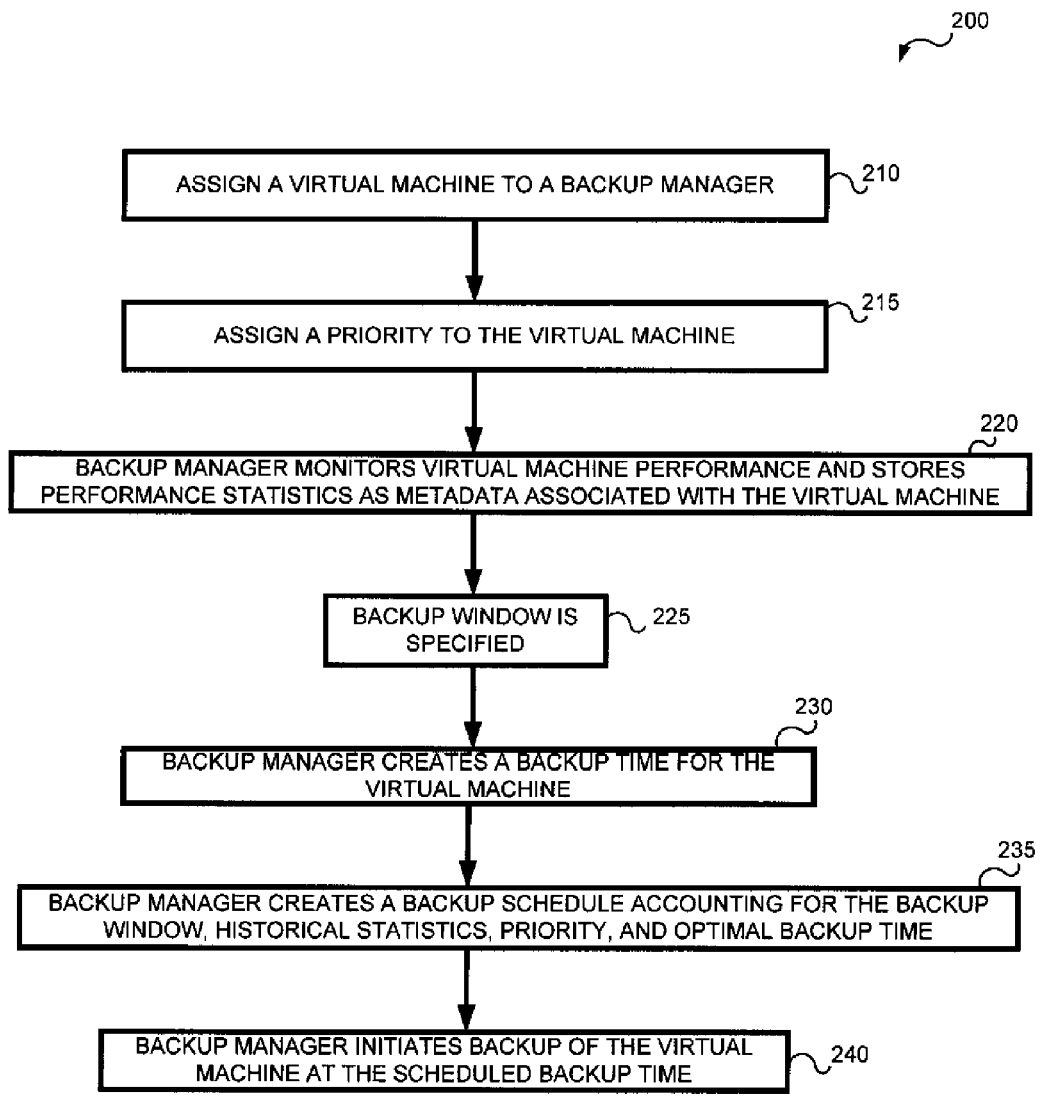
FIG. 2 shows an exemplary method for scheduling backup operations in accordance with an embodiment of the present disclosure.

Referring now to FIG. 2, there is shown an exemplary method 200 for scheduling backup operations in accordance with an embodiment of the present disclosure. In step 210, a virtual machine 130 may be assigned to a backup manager 101. The assignment may occur after the virtual machine 130 has been instantiated by a hypervisor 105 and 115, or virtual machines 130 may be assigned to a backup manager 101 according to another process. For example, all virtual machines 130 instantiated on System1 103 may be assigned to a first backup manager (e.g., 101).

In step 215, a priority may be assigned to the virtual machine 130. The priority may indicate the relative importance of the process for which the virtual machine 130 was instantiated. Priority may be assigned to the virtual machine 130 before the virtual machine 130 is assigned to a backup manager 101, so that step 215 may occur before step 210.

In step 220, the backup manager 101 may monitor the performance of the virtual machine 130, including, for example, processor, memory, network requirements, up time, relative weight, disk usage, and/or available system capacity, and may store such performance information as metadata associated with the virtual machine 130. Step 220 may also be performed before a priority is assigned to the virtual machine 130 in step 215.

In step 225, a backup window is specified. The backup window may be a period of time during a day, a week, a month, or a year in which backups may take place. An operator may define the backup window, or the backup window may be calculated based on, for example, idle times of the virtual machines 130 and/or systems 103 and 113.

In step 230, the backup manager 101 may create a potential backup time for the virtual machine 130. The backup time may be the time at which the backup may occur with reduced downtime effect. For example, a backup time may take into account periods of inactivity or low activity of the virtual machine 130, or the backup time may take into account periods of inactivity or low activity of the systems 103 and 113.

In step 235, the backup manager 101 may create a backup schedule for one or more of the virtual machines 130. For example, the backup manager 101 may create a backup schedule for all of the virtual machines 130 instantiated on the systems 103 and 113, or may create a backup schedule for all of the virtual machines assigned to the backup manager 101. The backup manager 101 may create the backup schedule by taking into account, for example, the specified backup window, historical statistics of the one or more virtual machines 130, the priority of the virtual machines 130, the backup times created in step 230, up time, relative weight, disk usage, and/or available system capacity. To create the backup schedule, the backup manager 101 may create a union of the historical data of the virtual machines 130. The backup manager 101 may use the union of historical data, with the specified backup times, to find one or more windows in which backups may occur. Highest priority virtual machines 130 may be scheduled for backup first, and then successively lower priority virtual machines 130 may be scheduled. The backup manager 101 may also use the estimated backup time to calculate which virtual machines 130 may be backed up during a window. The backup manager 101 may also move backup times of virtual machines 130 in order to accommodate unanticipated activity by a virtual machine 130, the creation of one or more new virtual machines 130, or the movement of virtual machines 130 from one system to another system.

In step 240, the backup manager 101 may initiate the backup of the virtual machine 130 according to the backup schedule.

Referring now to FIG. 3, there is shown exemplary historical data of three virtual machines in accordance with an embodiment of the present disclosure. Processor usage data for an exemplary section of a week is shown, including 12 AM through 5 AM on a Monday, 9 PM through midnight on Monday, 12 AM through 5 AM on a Tuesday, and 9 PM through midnight on Tuesday. The numbers recorded at each of the hour markers indicates the percentage of processor availability that each virtual machine required over the aggregated hour. Information may be recorded and displayed at other granularities. For example, information regarding processor requirements for each virtual machine may be recorded and stored at each second, or each minute, or other aggregation. The backup manager 101 may have recorded the data shown in FIG. 3 from the last backup cycle of the virtual machines 130, or may have aggregated the information from two or more backup cycles.

The three exemplary virtual machines are shown in FIG. 3 as VM1, VM2, and VM3. VM1 has been assigned a priority of 1, VM2 has been assigned a priority of 5, and VM3 has been assigned a priority of 6. In this exemplary embodiment, a higher priority number is granted higher priority, so VM3 has the highest priority of the three virtual machines, and VM1 has the lowest priority. Priority may be assigned by an operator, or priority may be assigned to the one or more virtual machines by the system 100, the backup manager 101, or another system on the network.

In the example shown in FIG. 3, VM1, with a priority of 1, may utilize one percent of the available processor resources between 12 AM and 5 AM, and may utilize 20 percent at 8 PM, 25 percent at 9 PM, 80 percent at 10 PM, and 90 percent at 11 PM. VM1 may not utilize any of the available processor resources on Tuesday. VM2, with a priority of 5, may utilize 20 percent of the available processor resources between 1 AM and 5 AM on Monday, and between 1 AM and 5 AM on Tuesday. VM2 may not utilize the available processor resources at other times on Monday or Tuesday. VM3, with a priority of 6, may utilize 90 percent of the available processor resources at 12 AM on Monday, 5 percent at 1 AM, and 90 percent at 2 AM, and may not utilize the processor resources at other times on Monday and Tuesday.

One or more backup windows may be specified. The backup windows may be a time in which backups take place. The backup windows may be specified by an operator, or may be automatically selected according to the relative usages of the virtual machines 130. In this example, backup windows may correspond to Monday between 12 AM and 5 AM and between 9 PM on Monday and 5 AM the following Tuesday.

The optimal backup window found from the example in FIG. 3 may be the window of time from 12 AM to 5 AM on Tuesday. The highest priority virtual machine, in this instance VM3, may be scheduled for backup during that time. 9 PM to 11 PM on Monday, a smaller portion of the 9 PM to midnight backup window specified, may be the second-best backup window in this example, and 3 AM to 5 AM, a smaller portion of the 12 AM to 5 AM backup window specified, may be the third-best backup window. The backup manager 101 may attempt to create a backup schedule in which all three of the virtual machines are backed up during the best backup window, using the calculated estimated backup times for each of the virtual machines. If the backup for VM3 does not allow for the backup of VM2 to complete by the end of the best backup window, the backup manager 101 may schedule VM2's backup during the second-best window. Similarly, if VM1 cannot complete within the second-best backup window after the completion of the backup for VM2, then the backup manager 101 may select VM1 for backup during the third-best backup window.

At this point it should be noted that the systems and methods in accordance with the present disclosure as described above typically involves the processing of input data and the generation of output data to some extent. This input data processing and output data generation may be implemented in hardware or software. For example, specific electronic components may be employed in a computerized system or similar or related circuitry for implementing the functions associated with a backup manager 101 in accordance with the present disclosure as described above. Alternatively, one or more processors operating in accordance with instructions may implement the functions associated with the backup manager 101 in accordance with the present disclosure as described above. If such is the case, it is within the scope of the present disclosure that such instructions may be stored on one or more processor-readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An apparatus for scheduling one or more backup operations comprising:
   at least one memory; and
   at least one processor communicatively coupled to the at least one memory and configured to execute instructions provided by the at least one memory, the at least one processor comprising:

one or more virtual machines to operate on one or more systems;

a backup manager configured to:
monitor resource requirements associated with at least one of the one or more virtual machines at predetermined time intervals,
associate the resource requirements with each of the one or more virtual machines to create a backup window for each of the one or more virtual machines;
create a backup schedule for the one or more virtual machines based at least in part upon the resource requirements and the backup window associated with the at least one of the one or more virtual machines; and
a module for implementing backups of the one or more virtual machines based at least in part upon the backup schedule created by the backup manager and at least in part on a priority level assigned to the at least one of the one or more virtual machines, wherein the backup schedule and priority level are used for scheduling one or more backup operations.

2. The apparatus of claim 1, where the resource requirements include processor requirements.

3. The apparatus of claim 1, where the resource requirements include memory requirements.

4. The apparatus of claim 1, where the resource requirements include network requirements.

5. The apparatus of claim 1, where the resource requirements include noting if the virtual machine is in operation.

6. The apparatus of claim 1, wherein the monitoring comprises monitoring the resource requirements associated with the at least one of the one or more virtual machines once per second.

7. The apparatus of claim 1, wherein the monitoring comprises monitoring the resource requirements associated with the at least one of the one or more virtual machines once per minute.

8. The apparatus of claim 1, wherein the monitoring comprises monitoring the resource requirements associated with the at least one of the one or more virtual machines once per hour.

9. A method for scheduling one or more backup operations comprising the steps of:
providing one or more virtual machines to operate on one or more systems;
monitoring resource requirements associated with at least one of the one or more virtual machines at predetermined time intervals;
associating the resource requirements with each of the one or more virtual machines to create a backup window for each of the one or more virtual machines;
creating a backup schedule for the one or more virtual machines based at least in part upon the resource requirements and the backup window associated with the at least one of the one or more virtual machines; and
implementing backups of the one or more virtual machines based at least in part upon the backup schedule and at least in part on a priority level assigned to the at least one of the one or more virtual machines, wherein the backup schedule and priority level are used for scheduling one or more backup operations.

10. The method of claim 9, where the resource requirements include processor requirements.

11. The method of claim 9, where the resource requirements include memory requirements.

12. The method of claim 9, where the resource requirements include network requirements.

13. The method of claim 9, where the resource requirements include noting if the virtual machine is in operation.

14. The method of claim 9, wherein the monitoring comprises monitoring the resource requirements associated with the at least one of the one or more virtual machines once per second.

15. The method of claim 9, wherein the monitoring comprises monitoring the resource requirements associated with the at least one of the one or more virtual machines once per minute.

16. The method of claim 9, wherein the monitoring comprises monitoring the resource requirements associated with the at least one of the one or more virtual machines once per hour.

17. The method of claim 9, wherein monitoring the resource requirements associated with at least one of the one or more virtual machines at predetermined time intervals comprises acquiring historical data for the at least one of the one or more virtual machines.

18. The method of claim 9, wherein associating the resource requirements with each of the one or more virtual machines comprises generating and initial backup time within the backup window for each of the one or more virtual machines.

19. At least one non-transitory processor-readable storage medium for storing a computer program of instructions configured to be readable by at least one processor for instructing the at least one processor to execute a computer process for performing the method as recited in claim 9.

20. An article of manufacture for scheduling one or more backup operations, the article of manufacture comprising:
at least one non-transitory processor-readable storage medium; and
instructions carried on the at least one medium;
wherein the instructions are configured to be readable from the at least one medium by at least one processor and thereby cause the at least one processor to operate so as to:
provide one or more virtual machines to operate on one or more systems;
monitor resource requirements associated with at least one of the one or more virtual machines at predetermined time intervals;
associate the resource requirements with each of the one or more virtual machines to create a backup window for each of the one or more virtual machines;
create a backup schedule for the one or more virtual machines based at least in part upon the resource requirements and the backup window associated with the at least one of the one or more virtual machines; and
implement backups of the one or more virtual machines based at least in part upon the backup schedule and at least in part on a priority level assigned to the at least one of the one or more virtual machines, wherein the backup schedule and priority level are used for scheduling one or more backup operations.

* * * * *